(12) United States Patent
Liu

(10) Patent No.: US 12,454,932 B2
(45) Date of Patent: Oct. 28, 2025

(54) WAVE INERTIAL-FORCE ELECTRICITY GENERATING APPARATUS

(71) Applicant: Ti-Hsin Wang, Kaohsiung (TW)

(72) Inventor: Wen-Yen Liu, Kaohsiung (TW)

(73) Assignee: TI-HSIN WANG, Kaohsiung (TW)

( * ) Notice: Subject to any disclaimer, the term of this patent is extended or adjusted under 35 U.S.C. 154(b) by 0 days.

(21) Appl. No.: 18/718,748

(22) PCT Filed: Apr. 22, 2022

(86) PCT No.: PCT/CN2022/088379
§ 371 (c)(1),
(2) Date: Jun. 11, 2024

(87) PCT Pub. No.: WO2023/201679
PCT Pub. Date: Oct. 26, 2023

(65) Prior Publication Data
US 2024/0418143 A1    Dec. 19, 2024

(51) Int. Cl.
*F03B 13/00* (2006.01)
*F03B 13/14* (2006.01)

(52) U.S. Cl.
CPC .......... *F03B 13/14* (2013.01); *F05B 2220/61* (2013.01)

(58) Field of Classification Search
CPC .............. F03B 13/14; B01J 19/087; B01J 2219/00045; B01J 2219/0803; F05B 2220/61
See application file for complete search history.

(56) References Cited

U.S. PATENT DOCUMENTS 4,009,396 A * 2/1977 Mattera ................... F03B 13/20
290/53
4,203,294 A * 5/1980 Budal ................... F03B 13/148
60/497

(Continued)

FOREIGN PATENT DOCUMENTS

CN       2208622 Y    9/1995
CN     102182616 A    9/2011

(Continued)

*Primary Examiner* — Julio C. Gonzalez
(74) *Attorney, Agent, or Firm* — MUNCY, GEISSLER, OLDS & LOWE, P.C.

(57) ABSTRACT

The present invention provides a wave inertial-force electricity generating apparatus configured to receive an energy of a wave on a water surface and including a main body unit, a mass unit, and an energy conversion unit. The main body unit includes a main body disposed on the water surface, a surrounding wall disposed at the main body and enclosing an accommodating space, and a fixed body connected to the main body, where the main body is pushed by the wave to move with respect to the fixed body, and the fixed body is configured to limit a movement range of the main body. The mass unit includes a mass body movably disposed in the accommodating space, where the mass body is pushed by the main body to move inertially in the accommodating space. The energy conversion unit includes an electricity generating module disposed at the main body and connected to the mass body, where the electricity generating module absorbs an inertial force of the mass body and converts the inertial force to electricity. Therefore, a wave force can be obtained for electricity generation while the coastline is protected.

2 Claims, 6 Drawing Sheets

(56) References Cited

U.S. PATENT DOCUMENTS

| | | | | |
|---|---|---|---|---|
| 4,208,875 | A | * 6/1980 | Tsubota | F03B 13/184 417/337 |
| 4,851,704 | A | * 7/1989 | Rubi | F03B 13/20 417/332 |
| 2009/0315330 | A1 | * 12/2009 | Dederick | F03D 9/008 290/55 |
| 2011/0169265 | A1 | * 7/2011 | Chen | F03B 13/22 290/53 |

FOREIGN PATENT DOCUMENTS

| | | |
|---|---|---|
| CN | 106640494 A | 5/2017 |
| CN | 110159500 A | 8/2019 |
| CN | 111997817 A | 11/2020 |
| TW | M599855 U | 8/2020 |
| WO | WO-2019/136007 A1 | 7/2019 |

* cited by examiner

WAVE INERTIAL-FORCE ELECTRICITY GENERATING APPARATUS

TECHNICAL FIELD

This application relates to an electricity generating apparatus, and in particular to, a wave inertial-force electricity generating apparatus.

BACKGROUND

With the increase in environmental awareness, renewable energy sources have gained attention from the public. Wind power occupies a certain proportion of renewable energy sources for electricity generation. Generally, when a wind electricity generating apparatus operates, a wind force produced by air flow pushes fan blades to rotate, and the rotation of the fan blades further drives a generator to produce electricity. Generally, offshore wind resources are more abundant in a stable wind direction than onshore resources, allowing offshore wind electricity generation to provide more electricity stable in the same time than onshore wind electricity generation. However, as compared with the onshore wind electricity generation, the construction expenses as well as maintenance and repair expenses become the main costs of the offshore wind electricity generation.

Referring to FIG. 1, Chinese Taiwan patent No. M599855 has provided a buoy-actuated bidirectionally-driven wave electricity generating apparatus 11, which includes a pipe member 111, a float body 112, a drive assembly 113, a mounting base 114, a connector 115, a base 116, an antenna 117, and a battery 118. The float body 112 floats on the water surface, the pipe member 111 penetrates into the float body 112, the drive assembly 113 is disposed in the pipe member 111 to obtain impetus for vertical movement, and an electricity generating module (not shown in the figure) is disposed on the mounting base 114. The connector 115 is connected to the pipe member 111 and the float body 112 to allow the pipe member 111 to only move vertically. The base 116 is enough heavy to sink into the water and the pipe member 111 is enabled to stand upright on the water surface. The antenna 117 can send and receive signals externally and the battery 118 can store the electricity generated by the electricity generating module. The offshore wave can drive the float body 112 to move vertically, enabling the pipe member 111 to move vertically with respect to the float body 112, and drive the drive assembly 113 to obtain impetus from the wave, so as to further drive the electricity generating module to operate.

It can be known from the foregoing description that although the wave generating apparatus is provided, it has certain limitations during practical application:

1. Unable to Obtain Lateral Movement Force of Waves

The wave on the water surface repeatedly changes the height of the water surface, such that the existing float body 112 floats vertically to drive the drive assembly 113, so as to obtain the force of the change in the height of the water surface. However, in addition to the vertical movement force, the wave on the water surface generates a lateral movement force between left and right sides. The terrain condition near a shoreline can enhance the lateral movement force of the waves. The existing wave electricity generating technologies cannot take advantage of the lateral wave force for electricity generation.

2. Insufficient Structure Strength

A wave electricity generating structure is typically provided with a movable mechanism in need of absorbing impetus from a wave, for example, the existing connector 115 connected to the pipe member 111 and the float body 112, thus allowing the drive assembly 113 in the pipe member 111 to obtain the wave force. However, such structure exceeding the outside of the float body 112 is subjected to impact of the external winds and waves. When strong winds and high waves occur at sea, the structure disposed outside cannot withstand the impact of the winds and waves and thus is damaged.

3. High Costs and Insignificant Electricity Generating Effects

An electricity generating apparatus disposed offshore is typically a single entity as an electricity generating unit, which has a limited capability of electricity generation. In addition, the electricity generated by the offshore electricity generating apparatus needs to be transferred to the mainland, and thus it is necessary to set up long electricity transfer cables. Construction of offshore electricity generating devices consumes high costs, but the electricity obtained by the onshore electricity grid is not substantial. This exposes the limitation of electricity generating effects.

4. Unable to Protect the Coastline

The existing wave electricity generating apparatus floats on the water surface, floating vertically along with the height of the wave, and cannot withstand the impact force of the wave, unable to serve as a tetrapod. In addition, no avoidance space is spared in the bottom for small fish, and a living environment cannot be provided for a fish school, providing no protection for the nearby marine ecology and topography.

Therefore, those skilled in the related art need to figure out how to construct, along the coastline, an electricity generating apparatus, which can protect the coastline, obtain the wave force, absorb the lateral force of the waves for electricity generation, and avoid the structural damage caused by the impact of winds and waves, so as to achieve better electricity generating efficiency.

SUMMARY

One or more embodiments disclosed herein describe a wave inertial-force electricity generating apparatus designed to obtain wave force for electricity generation while simultaneously providing coastal protection.

The wave inertial-force electricity generating apparatus, configured to receive an energy of a wave on a water surface and comprises a main body unit, a mass unit, and an energy conversion unit.

The main body unit comprising a main body disposed on the water surface, a surrounding wall disposed at the main body and enclosing an accommodating space, and a fixed body connected to the main body. The main body is pushed by the wave to move with respect to the fixed body, and the fixed body is configured to limit a movement range of the main body; The mass unit comprises a mass body movably disposed in the accommodating space, and the mass body is pushed by the main body to move inertially in the accommodating space.

The energy conversion unit comprises an electricity generating module disposed at the main body and connected to the mass body, and the electricity generating module absorbs an inertial force of the mass body.

In some embodiments, the mass body is a liquid, the surrounding wall defines the accommodating space as a flow channel, the accommodating space has a first end and a second end corresponding to each other, and after pushed by the main body, the mass body flows from the first end of the accommodating space to the second end.

In some embodiments, the surrounding wall comprises an inclined portion disposed between the first end and the second end, and a structure of the inclined portion gradually rises from the first end to the second end.

In some embodiments, the surrounding wall defines the accommodating space as an annular flow channel. The accommodating space further has another first end and another second end, and the plurality of first ends and second ends in the accommodating space are arranged in turn.

In some embodiments, the plurality of first ends of the accommodating space communicate with each other.

In some embodiments, the main body unit further comprises a backstop structure disposed in the main body and located between the first end and the second end of the accommodating space, and the backstop structure is configured to prevent the mass body in the second end of the accommodating space from flowing to the first end of the accommodating space.

In some embodiments, the fixed body comprises a fixed portion and a connection portion connected to both the main body and the fixed portion.

In some embodiments, the energy conversion unit further comprises an ionization module electrically connected to the electricity generating module. The electricity generating module is configured to convert the inertial force of the mass body to electricity for the ionization module to use, and the ionization module is configured to ionize water into hydrogen and oxygen.

In some embodiments, the mass body is a solid body, the electricity generating module comprises at least one force-receiving portion connected to the main body and an electricity generating portion connected to the force-receiving portion. The mass body separably abuts against the force-receiving portion, and the force-receiving portion is configured to absorb the inertial force of the mass body and transfer the force to the electricity generating portion.

In some embodiments, the main body comprises at least one backstop structure connected to the surrounding wall and disposed in the accommodating space, and the backstop structure is configured to push the mass body, allowing the mass body to move inertially and unidirectionally in the accommodating space.

The feature of this disclosure is that when the main body is influenced by wave forces, resulting in tilting or movement, the mass body will react accordingly. Once the main body is obstructed by the fixed body and ceases movement, the mass body generates inertial movement within the accommodating space. Subsequently, the electricity generating module harnesses this inertial force from the mass body, converting it into electricity for external use.

DETAILED DESCRIPTION

Referring to the accompanying drawings and six specific embodiments, other features and of embodiments of the present disclosure is further described, such that those skilled in the art can better understand and implement the present disclosure. However, the exemplary embodiments should not be considered as limitations to the present disclosure.

Figure 1:
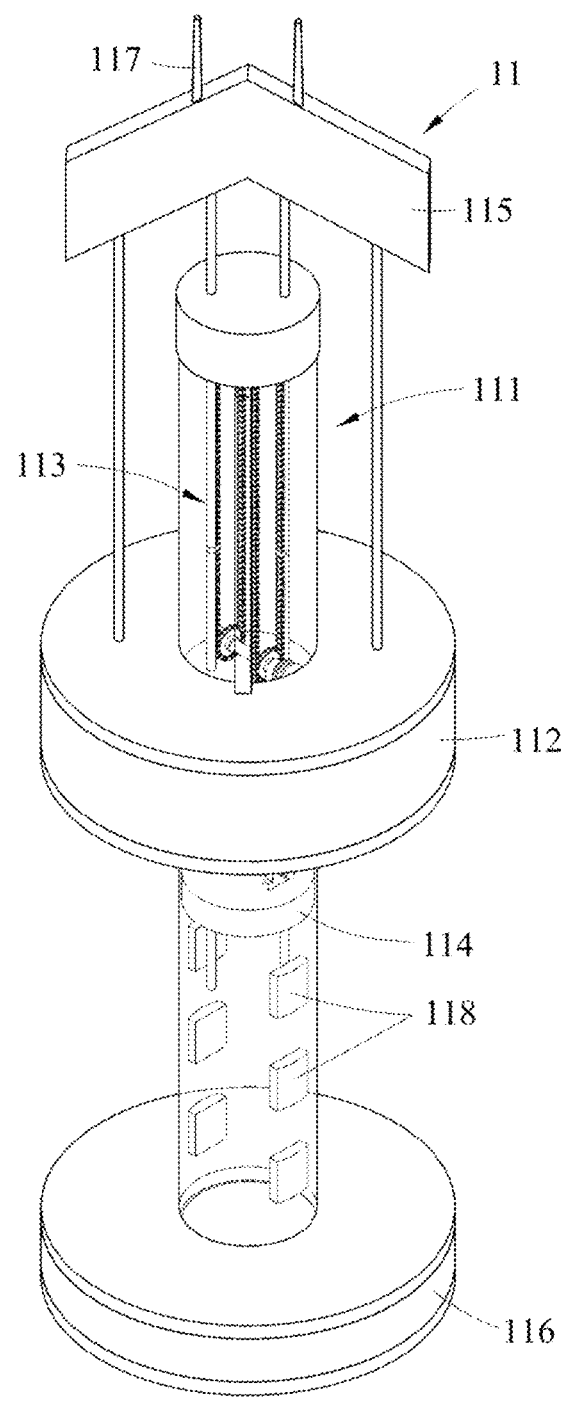
FIG. 1 is a schematic three-dimensional diagram of an apparatus, showing a buoy-actuated bidirectionally-driven wave electricity generating apparatus disclosed by Chinese Taiwan patent No. M599855.
Figure 2:
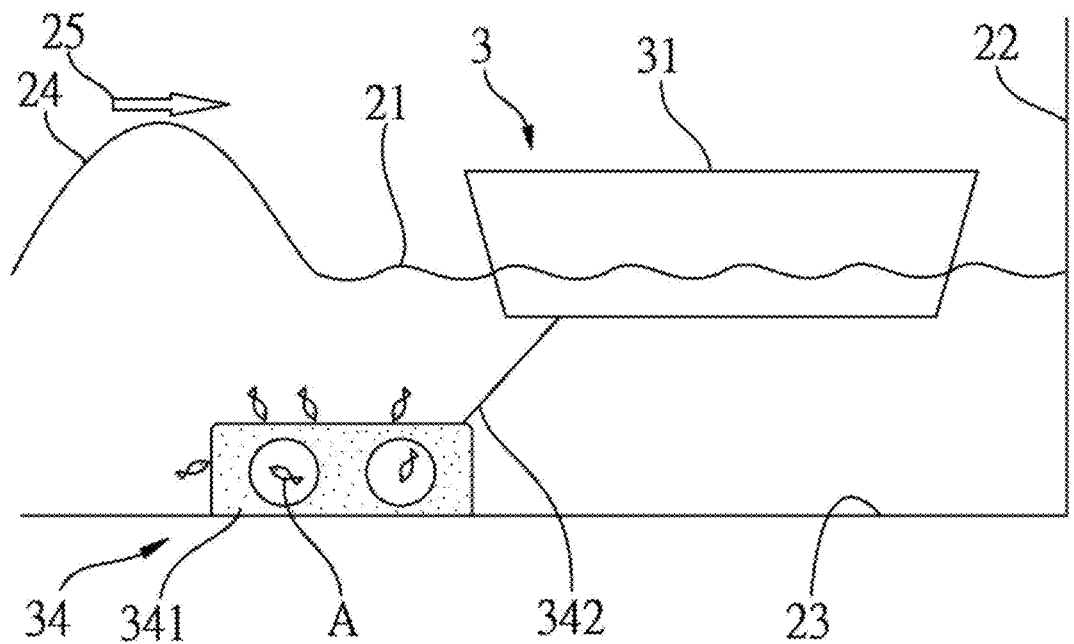
FIG. 2 is a schematic side view, illustrating a state of a main body of a wave inertial-force electricity generating apparatus being disposed on a water surface close to a coastline according to a first embodiment.
Figure 3:
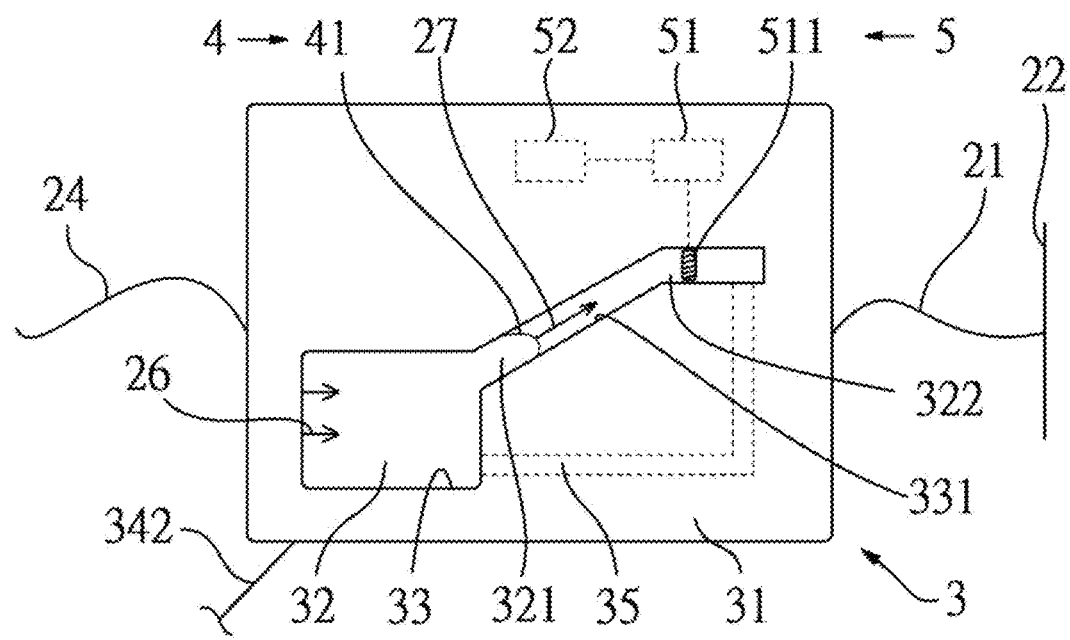
FIG. 3 is a schematic cross-sectional side view, illustrating a cross-sectional state of the main body at a side view in the first embodiment.

Referring to FIGS. 2 and 3, a wave inertial-force electricity generating apparatus is illustrated according to a first embodiment. The wave inertial-force electricity generating apparatus is disposed on a water surface 21 and configured to receive a force of a wave 24 on the water surface 21, enabling it to generate an inertial force, and absorb the inertial force to generate electricity.

The wave inertial-force electricity generating apparatus comprises a main body unit 3, a mass unit 4, and an energy conversion unit 5.

The main body unit 3 includes a main body 31 disposed on the water surface 21, a surrounding wall 33 disposed at the main body 31 and enclosing an accommodating space 32, and a fixed body 34 connected to the main body 31. The main body 31 is pushed by the wave 24 to move with respect to the fixed body 34. In the first embodiment, the main body 31 is disposed close to the shore 22. The fixed body 34 is provided with a fixed portion 341 disposed at a water bottom 23 and a connection portion 342 connected to both the main body 31 and the fixed portion 341. The fixed portion 341 is a pile body fixed at the water bottom 23. The connection portion 342 is a rope connecting the fixed portion 341 and the main body 31. The fixed body 34 is configured to pull the main body 31 and limit a float movement range of the main body 31 and enables the mass unit 4 to move inertially while pulling the main body 31. In some embodiments, one more fixed connecting rope may be arranged between the shore 22 and the main body 31, which is not limited thereto.

In the first embodiment, the structure of the fixed portion 341 may be an artificial fish reef whose surface is rough for waterweeds to grow. Hollow cavities are provided in the structure to attract a fish school A to enter and avoid hunting from large-sized fishes, which is conducive for sea creatures to grow. In some embodiments, the fixed portion 341 may alternatively be an artificial fish reef or a structure in another form, which is not limited thereto.

The mass unit 4 includes a mass body 41 movably disposed in the accommodating space 32. The mass body 41 is pushed by the main body 31 to move inertially in the accommodating space 32. In the first embodiment, the mass body 41 is a liquid, and the surrounding wall 33 defines the accommodating space 32 as a flow channel. The accommodating space 32 has a first end 321 and a second end 322 corresponding to each other. After pushed by the main body 31, the mass body 41 flows from the first end 321 of the accommodating space 32 to the second end 322. The surrounding wall 33 includes an inclined portion 331 disposed between the first end 321 and the second end 322, and a structure of the inclined portion 331 gradually rises from the first end 321 to the second end 322. The main body 31 is provided with a water tank at the first end 321, and the main body unit 3 further includes a flow return pipe 35 disposed between the second end 322 and the water tank. The flow return pipe 35 extends downward from the second end 322 of the accommodating space 32 and then extends laterally toward the main body 31.

The energy conversion unit 5 includes an electricity generating module 51 disposed at the main body 31 and connected to the mass body 41. The electricity generating module 51 absorbs an inertial force of the mass body 41 to generate electricity. In the first embodiment, the electricity generating module 51 is an electricity generating machine and includes turbine blades 511 disposed at the second end 322 of the accommodating space 32. The turbine blades 511 can withstand the impact from water flows to drive the electricity generating module 51 to generate electricity.

In the first embodiment, the wave 24 generated on the water surface 21 moves toward the shore 22 in a wave direction 25. When the connection portion 342 of the fixed body 34 has not tightly pulled the main body 31 of the main body unit 3 disposed close to the shore 22, the main body 31 is pushed by the wave 24 to move toward the shore 22. In this case, the surrounding wall 33 disposed on the left side in the main body 31 pushes the mass body 41 in the accommodating space 32 to move right in a pushing force direction 26, enabling the mass body 41 and the main body 31 to move right at the same time. Next, when the connection portion 342 of the fixed body 34 is subjected to a pulling force of the fixed portion 341 to be tight, it pulls the main body 31, stopping the movement of the main body 31. The mass body 41 in the accommodating space 32 of the main body unit 3 moves right based on the inertial force, flows from the first end 321 of the accommodating space 32 to the second end 322 in an inertial force direction 27, and impacts the turbine blades 511 disposed at the second end 322, to enable them to rotate, such that the electricity generating module 51 receives the inertial force of the mass body 41 for electricity generation. The mass body 41 flowing to the second end 322 of the accommodating space 32 is blocked by the surrounding wall 33 on the right side and flows into the flow return pipe 35 under the gravitation to return to the water tank of the main body 31. In this way, the mass body 41 can circulate in the main body 31. In some embodiments, the surrounding wall 33 may be not provided with the inclined portion 331. The first end 321 and the second end 322 of the accommodating space 32 are at the same height. The main body 31 may neither be provided with the flow return pipe 35, enabling the mass body 41 to naturally return from the second end 322 to the first end 321. The mass body 41 in the accommodating space 32 is still pushed by the main body 31, to impact the turbine blades 511 of the electricity generating module 51, which is not limited thereto.

In the first embodiment, the energy conversion unit 5 further includes an ionization module 52 electrically connected to the electricity generating module 51, and the electricity generating module 51 is configured to convert the inertial force of the mass body 41 to electricity for the ionization module 52 to use. The ionization module 52 is configured to ionize water into hydrogen and oxygen, and the produced hydrogen and oxygen can be stored or used through a gas transfer pipe. In some embodiments, the ionization module 52 may be not disposed, and the electricity generated by the electricity generating module 51 is directly transferred to an electricity grid using an electricity transfer cable or stored in a battery, which is not limited to the examples in this embodiment.

It should be noted that a wave receiving structure is typically disposed outside the wave electricity generating apparatus, such as a flow guide structure or a turbine blade structure to absorb the wave force for electricity generation. However, when the winds and waves are strong to some extent, the structure disposed outside cannot withstand the excessively strong winds and waves and thus is damaged. In addition, excessively weak winds and waves cannot cause an enough wave force for electricity generation. This exposes the defects of the existing wave electricity generating apparatus. The main electricity generating technologies of the present disclosure are to use the inertial force of the mass body 41 to generate electricity. All the mechanical structures are disposed on an inner side of the main body 31, and thus no complex structures are disposed outside the main body 31. The case of being damaged due to the impact of the winds and waves does not occur, and the present disclosure has the features of being able to withstand strong winds and waves.

Figure 4:
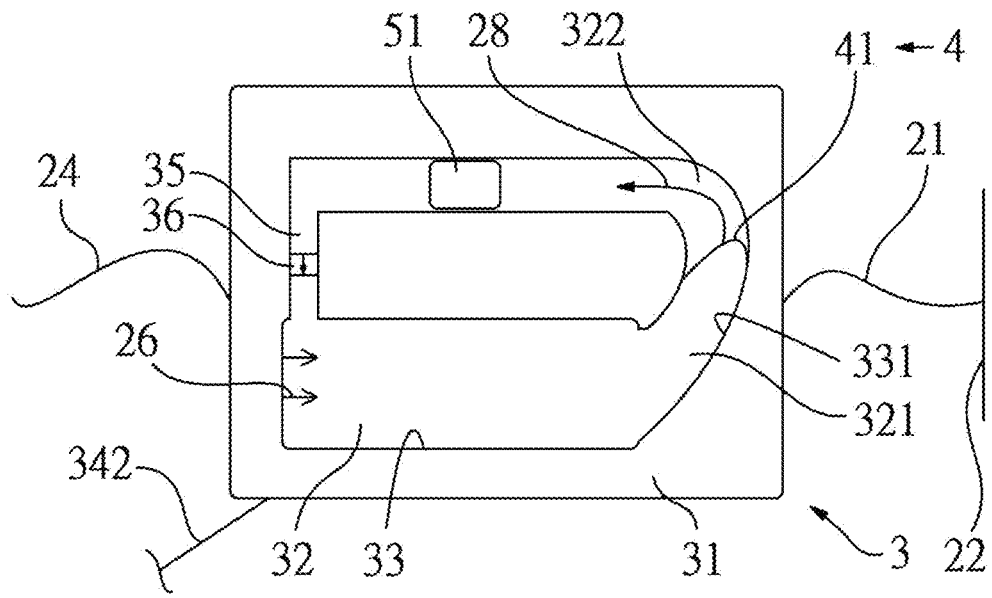
FIG. 4 is a schematic cross-sectional side view, illustrating a cross-sectional state of a main body at a side view according to a second embodiment.

Referring to FIGS. 2 and 4, a wave inertial-force electricity generating apparatus according to a second embodiment, the second embodiment is substantially the same as the first embodiment, and the same details are not repeated herein. The difference is as follows: The accommodating space 32 defined by the surrounding wall 33 forms a flow channel and the flow channel bends and extends upward. The electricity generating module 51 is disposed above the water tank of the main body 31. The inclined portion 331 of the surrounding wall 33 gradually rises from the first end 321 to the second end 322 and forms a bended structure at a position toward the electricity generating module 51. The inclined portion 331 is configured to guide the mass body 41 to flow to the electricity generating module 51. In addition, the main body 31 is further provided with a flow return pipe 35 on the left sides of the second end 322 and the first end 321. A backstop structure 36 is disposed in the flow return pipe 35 and configured to prevent the mass body 41 in the first end 321 of the accommodating space 32 from flowing to the second end 322 through the flow return pipe 35. The mass body 41 in the second end 322 can flow to the first end 321 via the backstop structure 36. In this way, circulation flow of the mass body 41 is controlled in the accommodating space 32.

The wave 24 on the water surface 21 pushes the main body 31, so as to push the mass body 41 in the accommodating space 32 in the pushing force direction 26, enabling the mass body 41 and the main body 31 to move right at the same time. When the main body 31 is limited by the fixed body 34 to stop moving, the mass body 41 in the accommodating space 32 generates an inertial force to move right.

When the mass body 41 reaches the inclined portion 331 on the right side, the bended inclined portion 331 guides the mass body 41 to the electricity generating module 51 in a flow guide direction 28, so as to drive the electricity generating module 51 for electricity generation. The applicant emphasizes that the pushing force of the wave 24 at sea is quite strong, and the size of the wave 24 is affected not only by weather, but by terrain. Therefore, in the second embodiment, the force of the wave can drive the mass body 41 to move to a high position and the electricity generating module 51 to generate electricity.

Figure 5:
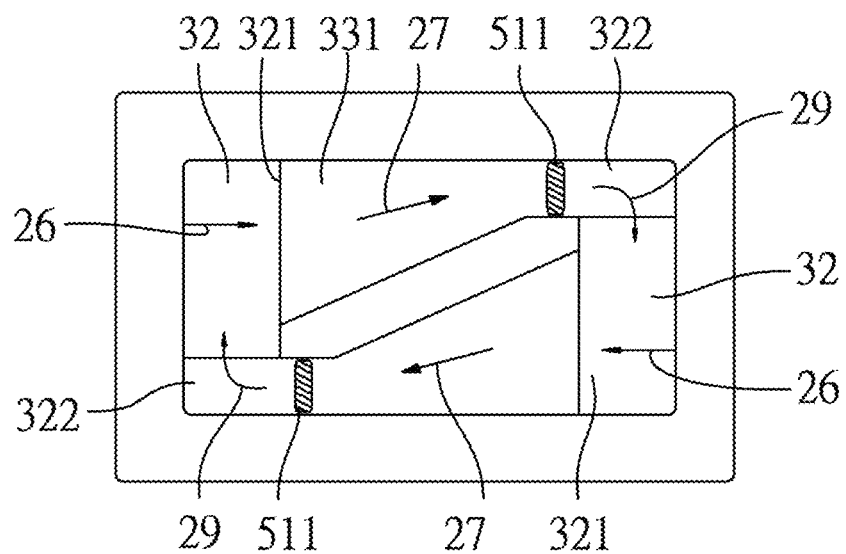
FIG. 5 is a schematic cross-sectional top view, illustrating a cross-sectional state of a main body at a top view according to a third embodiment.

Referring to FIGS. 2 and 5, a wave inertial-force electricity generating apparatus according to a third embodiment, the third embodiment is substantially the same as the first embodiment, and the same details are not repeated herein. The difference is as follows: The surrounding wall 33 defines the accommodating space 32 as an annular flow channel, and the accommodating space 32 further has another first end 321 and another second end 322, and the plurality of first ends 321 and second ends 322 in the accommodating space 32 are arranged in turn.

When pushing the main body 31 in the wave direction 25, the wave 24 on the water surface 21 enables the main body 31 to move right and pushes the mass body 41 in the pushing force direction 26. When the main body 31 is limited by the fixed body 34 to stop moving, the mass body 41 moves under the right inertial force with respect to the main body 31. In this case, the mass body 41 flows from the first end 321 of the accommodating space 32 to the second end 322 on the right side in the inertial force direction 27 and drives the turbine blades 511 in the flow channel. Because the second end 322 of the accommodating space 32 is high, the mass body 41 flowing to the second end 322 naturally flows into the right accommodating space 32 in a flow return direction 29. When the wave 24 on the water surface 21 reaches the shore 22, it is blocked and another wave 24 moving in a direction opposite to the wave direction 25 is caused to push the main body 31 to move left. In this case, the surrounding wall 33 on the right side of the main body 31 pushes the mass body 41 in the right accommodating space 32 in the left pushing force direction 26, enabling the main body 31 and the mass body 41 to move in a direction away from the shore 22. When the main body 31 is limited by the fixed body 34 to stop moving, the mass body 41 moves under the left inertial force with respect to the main body 31 and drives the turbine blades 511 below the electricity generating module 51 to rotate. The mass body 41 reaching the second end 322 falls into the accommodating space 32 on the left side under the gravitation in the flow return direction 29, and the mass body 41 in the accommodating space 32 flows clockwise under the force of the wave 24 in the accommodating space 32 forming the annular flow channel. In some embodiments, the plurality of first ends 321 in the accommodating space 32 communicate with each other, that is, a communication pipe can be disposed laterally at the bottom of the plurality of first ends 321, where the mass body 41 can flow in the communication pipe, allowing an enough amount of mass body 41 to move inertially in the first end 321 of each accommodating space 32, which is not limited thereto.

Figure 6:
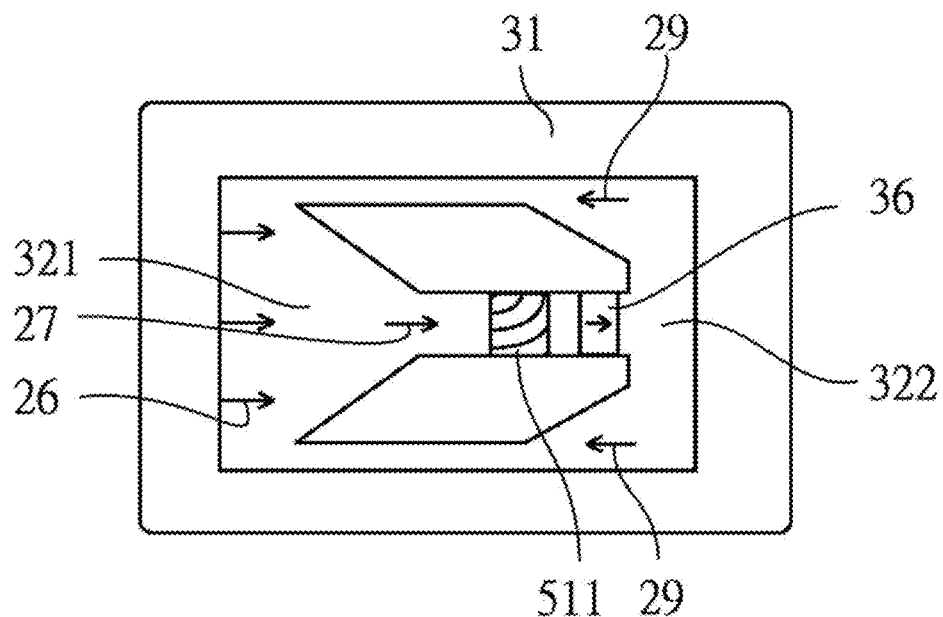
FIG. 6 is a schematic cross-sectional top view, illustrating a cross-sectional state of a main body at a top view according to a fourth embodiment.

Referring to FIGS. 2 and 6, of a wave inertial-force electricity generating apparatus according to a fourth embodiment, the fourth embodiment is substantially the same as the first embodiment, and the same details are not repeated herein. The difference is as follows: The first end 321 and the second end 322 of the accommodating space 32 are at the same height, and a plurality of flow channels are disposed between the first end 321 and the second end 322. The main body unit 3 further includes a backstop structure 36 disposed in the main body 31 and located between the first end 321 and the second end 322 of the accommodating space 32, and the backstop structure 36 is configured to prevent the mass body 41 in the second end 322 of the accommodating space 32 from flowing to the first end 321 of the accommodating space 32. In the fourth embodiment, a flow channel is disposed in the middle of the main body 31, a backstop structure 36 is disposed in the middle flow channel to drive the mass body 41 to flow right, and the turbine blades 511 of the electricity generating module 51 are disposed in the middle flow channel. Flow return channels are also disposed on upper and lower sides of the main body 31, and the mass body 41 in the second end 322 flows to the first end 321 through the flow return channels on upper and lower sides. When the wave 24 on the water surface 21 pushes the main body 31 to move right, the surrounding wall 33 on the left side in the main body 31 pushes the mass body 41 in the accommodating space 32 to move in the pushing force direction 26. When the main body 31 is limited by the fixed body 34 to stop moving, the mass body 41 in the accommodating space 32 moves in the inertial force direction 27 with respect to the main body 31 to flow into the middle flow channel, drives turbine blades 511 to rotate, and flows to the second end 322. After the inertial force disappears, the mass body 41 flowing into the second end 322 of the accommodating space 32 returns to the first end 321 of the accommodating space 32 through the flow return channels on upper and lower sides of the main body 31 in the flow return direction 29. This allows for circulation flow of the mass body 41 in the accommodating space 32.

Figure 7:
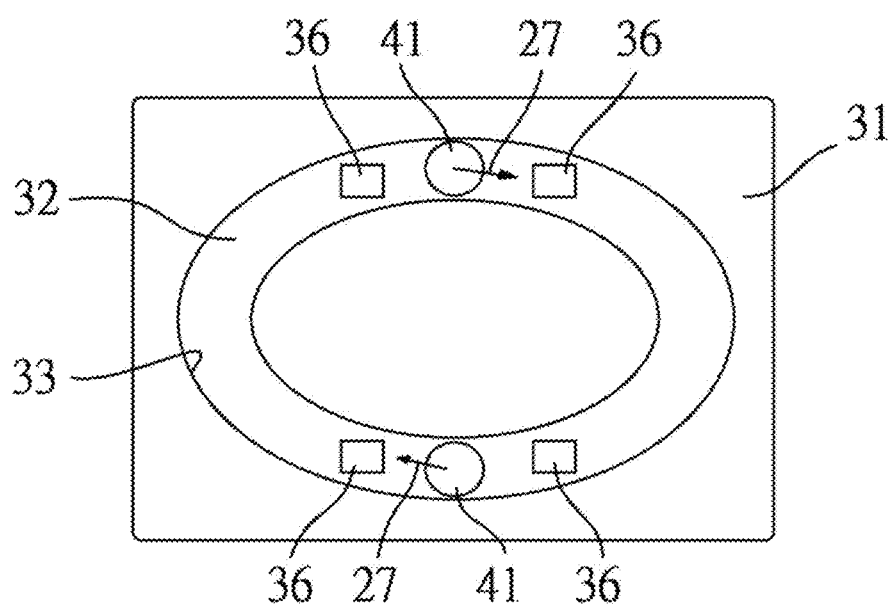
FIG. 7 is a schematic cross-sectional top view, illustrating a cross-sectional state of a main body at a top view according to a fifth embodiment.
Figure 8:
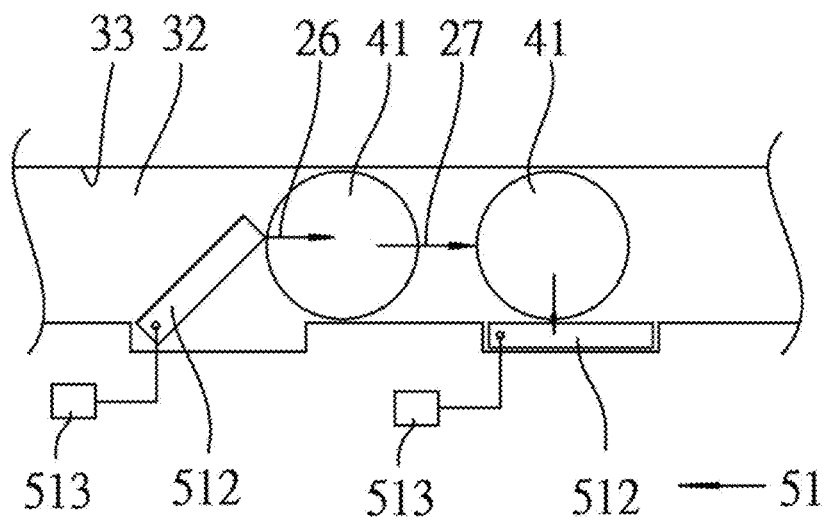
FIG. 8 is a schematic cross-sectional side view, illustrating rolling of a sphere-shaped mass body in an accommodating space and states of a force-receiving portion and an electricity generating portion of an electricity generating module that are disposed in the accommodating space in the fifth embodiment.

Referring to FIGS. 2, 7, and 8, a wave inertial-force electricity generating apparatus according to a fifth embodiment, the fifth embodiment is substantially the same as the first embodiment, and the same details are not repeated herein. The difference is as follows: The mass body 41 is a solid body, and the electricity generating module 51 includes at least one force-receiving portion 512 connected to the main body 31 and an electricity generating portion 513 connected to the force-receiving portion 512, the mass body 41 separably abuts against the force-receiving portion 512, and the force-receiving portion 512 is configured to absorb the inertial force of the mass body 41 and transfer the force to the electricity generating portion 513.

In the fifth embodiment, the mass body 41 is a circular sphere, the accommodating space 32 defined by the surrounding wall 33 forms an annular channel, and the mass body 41 can roll in the accommodating space 32 with respect to the main body 31. The force-receiving portion 512 of the electricity generating module 51 is a plate body disposed in the accommodating space 32. The force-receiving portion 512 tilts in the accommodating space 32, and the force-receiving portion 512 can pivot with respect to the main body 31. Preferably, the force-receiving portion 512 is supported at 45 degrees to the right in the accommodating space 32. When the mass body 41 approaches the right side of the force-receiving portion 512, the mass body 41 is blocked by the force-receiving portion 512 to stop moving. When the main body 31 is subjected to the force of the wave 24 to move right, the main body 31 drives the force-receiving portion 512 to push the mass body 41 in the pushing force direction 26, so as to enable the mass body 41 and the main body 31 to move right. When the main body 31 is limited by the fixed body 34 to stand still, the mass body 41 approaches another force-receiving portion 512 in the inertial force direction 27 and presses down the force-receiving portion 512. The electricity generating portion 513 of the electricity generating module 51 is connected to a rotation shaft of the force-receiving portion 512 and configured to receive the force of rotation of the force-receiving portion 512 for electricity generation. After the mass body 41 leaves the force-receiving portion 512, the force-receiving portion 512 rebounds to be in an inclined state. In the fifth embodiment, the force-receiving portion 512 of the electricity generating module 51 is not only a structure for absorbing the inertial force, but a backstop structure 36, to drive the mass body 41 to rotate clockwise in the accommodating space 32.

Figure 9:
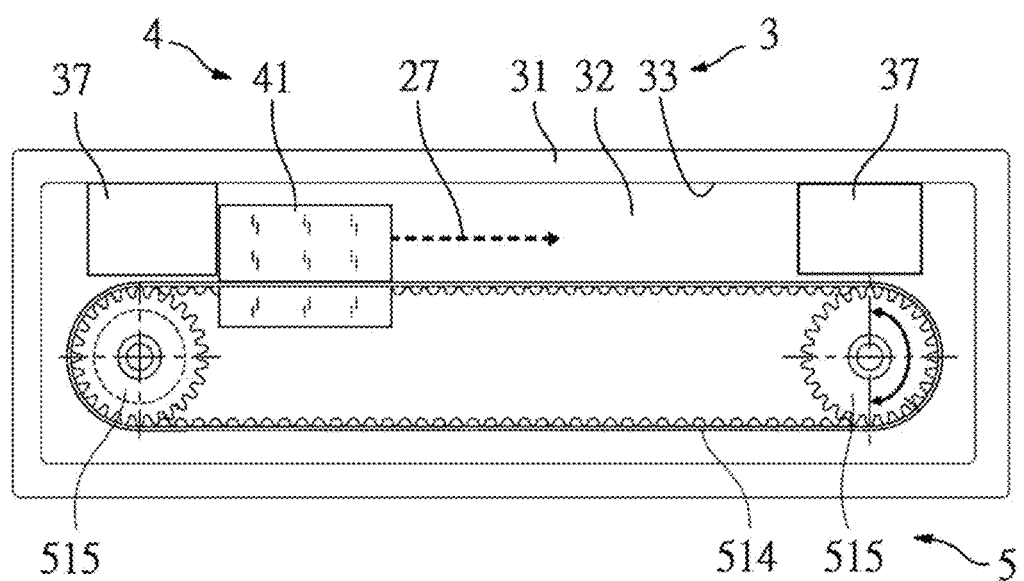
FIG. 9 is a schematic cross-sectional view, illustrating a cross-sectional state of a main body according to a sixth embodiment.

Referring to FIGS. 2 and 9, a wave inertial-force electricity generating apparatus according to a sixth embodiment, the sixth embodiment is substantially the same as the fifth embodiment, and the same details are not repeated herein. The difference is as follows: The electricity generating module 51 includes a timing belt 514 connected to the mass body 41, and two gears 515 apart from each other on the timing belt 514. The mass body 41 drives the timing belt 514 to move and the two gears 515 to rotate, and the electricity generating module 51 can generate electricity based on the rotation of the gears 515.

The main body unit 3 further includes two stop blocks 37 connected to the main body 31 and apart from each other in the accommodating space 32. The two stop blocks 37 can limit the movement range of the mass body 41. When the main body 31 is subjected to the pushing force of the wave 24 to move right, the left stop block 37 can push the mass body 41 to move right. When the main body 31 is limited by the fixed body 34 to stop moving, the mass body 41 moves with respect to the main body 31 in the inertial force direction 27 and drives the timing belt 514 to move. The two gears 515 transfer the inertial force of the mass body 41 to enable the electricity generating module 51 to generate electricity.

Figure 10:
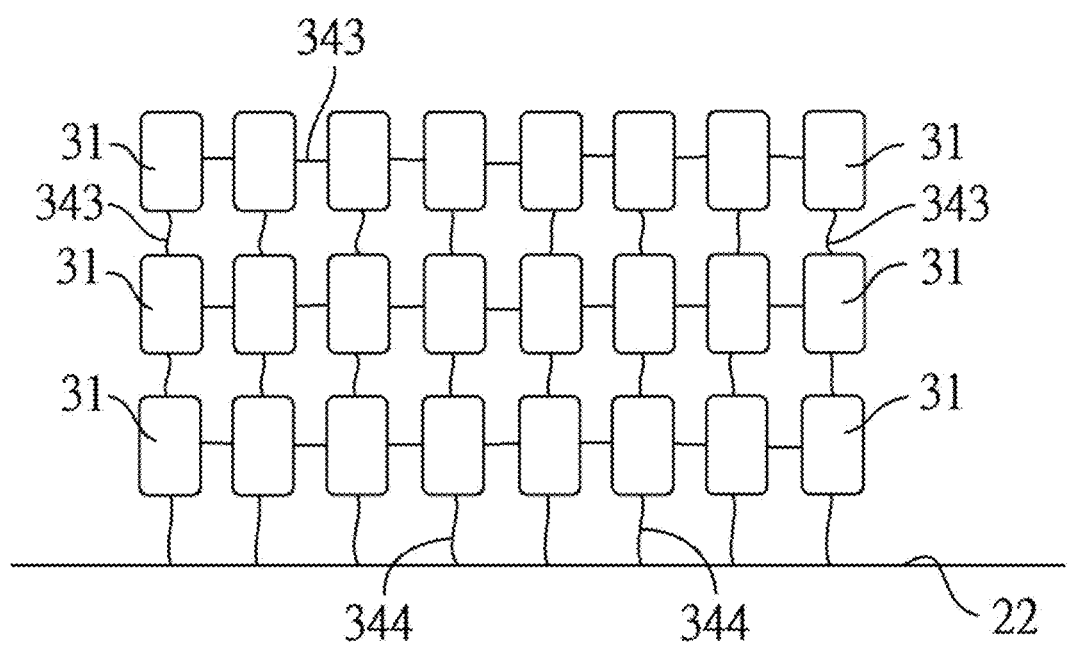
FIG. 10 is a schematic top view illustrating a state of a plurality of main bodies being connected and disposed along a shore.

Referring to FIG. 10, because the main body 31 is simple in structure and has no other complex structures outside, the main body 31 is not damaged due to strong winds and waves and a plurality of main bodies 31 can be connected using a rope. Preferably, the plurality of main bodies 31 can be arranged as a matrix along the shore 22 and configured to receive the force of the wave 24 moving toward the shore 22. When the plurality of main bodies 31 are limited by the fixed body 34 to stop moving, the force of the wave 24 is reduced. In this way, a plurality of wave inertial-force electricity generating apparatuses can be connected to eliminate the wave 24 without the need to dispose the tetrapod along the shore 22 in this region.

Preferably, when the plurality of main bodies 31 can be arranged as a matrix along the shore 22, a first connecting rope 343 can be provided among them, such that the positions of the plurality of main bodies 31 restrain each other via the first connecting rope 343. In addition, a second connecting rope 344 may be provided between the main body 31 close to the shore 22 and the shore 22, such that the shore 22 can pull the plurality of main bodies via the second connecting rope 344. In some embodiments, the connecting ropes may alternatively be not provided between the plurality of main bodies 31 or between them and the shore 22, which is not limited thereto.

In addition, when the plurality of main bodies 31 are disposed in the region close to the shore 22, the bottom of each main body 31 may be connected to a fixed body 34 disposed at the sea bed, so as to fix the position of the main body 31 on the water surface. In addition, the structure of the fixed portion 341 of the fixed body 34 is an artificial fish reef, which can provide the fish school A many growth environments and help the restoration of the marine ecology. In some embodiments, the plurality of main bodies 31 can be all fixed to one fixed body 34, which is not limited thereto.

It can be known from the foregoing description that the wave inertial-force electricity generating apparatus of the present disclosure has the following features:

1. Obtain the Lateral Movement Force of Waves

A terrain condition close to the shore 22 can increase the lateral movement force of the wave, and the side of the main body 31 can receive the force when being impacted during movement of the wave 24, thus enabling the mass body 41 in the main body 31 to move inertially. Further, the electricity generating module 51 can absorb the inertial force of the mass body 41 for electricity generation. Therefore, the present disclosure can obtain the lateral movement force of the wave for electricity generation.

2. Be not Prone to Impact of Winds and Waves

The main body 31 is simple in structure and the mass body 41 and the electricity generating module 51 are both provided therein, and therefore when confronting winds and waves, the structure in the main body 31 is not prone to damage. Most of the wave electricity generating apparatuses, usually, can directly withstand the wave force, but an excessively strong wave is likely to damage the structure and an excessively weak wave causes insignificant electricity generating effect. This is the main reason why the wave electricity generating apparatus has not yet been commercialized on a large scale to this day. The present disclosure can withstand the force of strong waves, and the precise electricity generators and structures are protected by the main body 31 and are not prone to damage.

3. Obtain a Large Amount of Electricity

The plurality of wave inertial-force electricity generating apparatuses can be disposed close to the shore 22, the electricity transfer cables are short to reduce the costs of the apparatuses, and the plurality of electricity generating modules 51 in the main bodies 31 can accumulate the electricity generated, which then is transferred to the mainland electricity grid, so as to obtain more electricity.

4. Protect the Coastline

The present disclosure provides a wave inertial-force electricity generating apparatus disposed along the shore 22, the force of the wave 24 impacting the shore 22 can be obtained, and a large amount of main bodies 31 disposed along the shore 22 can provide the function of tetrapod to weaken the impact force of the wave 24, which effectively prevents the coastline from being eroded by winds and waves. In addition, the fixed portion 341, as an artificial fish reef, can provide a habitat for the fish school A and is conducive to the growth of marine creatures.

In summary, the main body 31 is disposed on the water surface 21 along the shore 22 and can convert the force of the wave 24 to the inertial force of the mass body 41, and the electricity generating module 51 absorbs the inertial force of the mass body 41 for electricity generation. The plurality of main bodies 31 can be connected to each other and disposed along the shore 22. During electricity generation from the inertial force of the wave, the force of the wave 24 can be reduced to alleviate the erosion caused by the wave 24 on the shore, and thus the objective of the present disclosure can be achieved.

The foregoing six embodiments are merely provided to describe the present disclosure, and the scope of protection of the present disclosure is not limited thereto. Equivalent substitutions or modifications made by those skilled in the art based on the present disclosure are within the scope of protection of the present disclosure.

DESCRIPTION OF NUMERAL REFERENCES

A fish school
11 buoy-actuated bidirectionally-driven wave electricity generating apparatus
111 pipe member
112 float body
113 drive assembly
114 mounting base
115 connector
116 base
117 antenna
118 battery
21 water surface
22 shore
23 water bottom
24 wave
wave direction
26 pushing force direction
27 inertial force direction
28 flow guide direction
29 flow return direction
3 main body unit
31 main body
32 accommodating space
321 first end
322 second end
33 surrounding wall
331 inclined portion
34 fixed body
341 fixed portion
342 connection portion
343 first connecting rope
344 second connecting rope
flow return pipe
36 backstop structure
37 stop block
4 mass unit
41 mass body
energy conversion unit
51 electricity generating module
511 turbine blade
512 force-receiving portion
513 electricity generating portion
514 timing belt
515 gear
52 ionization module

What is claimed is:

1. A wave inertial-force electricity generating apparatus, configured to receive an energy of a wave on a water surface and comprising:
a main body unit comprising a main body disposed on the water surface, a surrounding wall disposed at the main body and enclosing an accommodating space, a fixed body connected to the main body, and two stop blocks extending from the surrounding wall into the accommodating space and spaced apart from each other, wherein the main body is pushed by the wave to move with respect to the fixed body, the fixed body is configured to limit a movement range of the main body, and the two stop blocks define a corresponding first end and a second end within the accommodating space;
a mass unit comprising a mass body movably disposed in the accommodating space and located between the first end and the second end, wherein the mass body is a solid body, pushed by the main body to reciprocate along a movement path between the first end and the second end in the accommodating space; and
an energy conversion unit comprising an electricity generating module disposed in the accommodating space and located on one side of the movement path between the first end and the second end, wherein the electricity generating module has a timing belt engaged with the mass body and two gears spaced apart within the timing belt, wherein the two stop blocks are configured to limit a movement range of the mass body along the movement path between the first end and the second end, when the main body is pushed by the wave, one of the stop blocks pushes the mass body to move, and when the main body stops moving, the mass body continues to move relative to the main body along the movement path between the first end and the second end due to an inertial force and continuously drives the timing belt to rotate, the two gears transferring the inertial force of the mass body to enable the electricity generating module to generate electricity; and
the energy conversion unit further comprises an ionization module electrically connected to the electricity generating module, the electricity generating module is configured to convert the inertial force of the mass body to electricity for the ionization module to use, and the ionization module is configured to ionize water into hydrogen and oxygen.

2. The wave inertial-force electricity generating apparatus of claim 1, wherein the fixed body comprises a fixed portion and a connection portion connected to both the main body and the fixed portion, and a structure of the fixed portion is an artificial fish reef.

* * * * *